(12) United States Patent
Dale et al.

(10) Patent No.: US 8,729,295 B2
(45) Date of Patent: May 20, 2014

(54) CONTROLLED CATALYSIS

(75) Inventors: James A. Dale, Cardiff (GB); Luc Froment, Wales (GB); Satish Bapat, Springfield, PA (US)

(73) Assignee: The Purolite Company, Bala Cynwyd, PA (US)

( * ) Notice: Subject to any disclaimer, the term of this patent is extended or adjusted under 35 U.S.C. 154(b) by 465 days.

(21) Appl. No.: 12/258,123

(22) Filed: Oct. 24, 2008

(65) Prior Publication Data

US 2009/0112016 A1 Apr. 30, 2009

Related U.S. Application Data

(60) Provisional application No. 60/983,093, filed on Oct. 26, 2007.

(51) Int. Cl.
*C07C 67/04* (2006.01)

(52) U.S. Cl.
USPC .................. 560/246; 560/234; 560/204

(58) Field of Classification Search
None
See application file for complete search history.

(56) References Cited

U.S. PATENT DOCUMENTS

| | | | |
|---|---|---|---|
| 2,678,332 A | 5/1954 | Cottle | |
| 2,922,822 A * | 1/1960 | Beach | ............... 568/689 |
| 2,934,670 A | 4/1960 | Gingrande | |
| 3,049,569 A | 8/1962 | Apel et al. | |
| 3,053,887 A | 9/1962 | Aries | |
| 3,133,030 A | 5/1964 | Wheaton | |
| 3,242,219 A | 3/1966 | Farnham et al. | |
| 3,242,921 A | 3/1966 | Seeler | |
| 3,252,921 A * | 5/1966 | Hansen et al. | ............... 521/28 |
| 3,278,585 A | 10/1966 | Baker et al. | |
| 3,678,099 A | 7/1972 | Kemp | |
| 3,729,457 A | 4/1973 | Davankov et al. | |
| 3,795,712 A | 3/1974 | Torck | |
| 4,051,079 A | 9/1977 | Melby | |
| 4,107,218 A | 8/1978 | Konrad et al. | |
| 4,168,390 A | 9/1979 | Alfs et al. | |
| 4,198,531 A | 4/1980 | Merger et al. | |
| 4,299,996 A | 11/1981 | Parlman | |
| 4,332,738 A | 6/1982 | Benitez et al. | |
| 4,396,728 A | 8/1983 | Faler | |
| 4,447,652 A | 5/1984 | Kurek | |
| 4,461,916 A * | 7/1984 | Alfs et al. | ............... 568/788 |

(Continued)

FOREIGN PATENT DOCUMENTS

DE 868147 2/1953
DE 868191 2/1953

(Continued)

OTHER PUBLICATIONS

Akelah, A. et al., Application of Functionalized Polymers in Organic Synthesis, 1981, Chemical Reviews, vol. 81, issue 6, pp. 557-587 (31 pages).*

(Continued)

*Primary Examiner* — Yate K Cutliff
(74) *Attorney, Agent, or Firm* — Fish & Richardson P.C.

(57) ABSTRACT

The present invention provides methods of using a novel sulfonated resin catalyst, showing improved performance. The catalyst has reduced or partial functionalization, throughout the sulfonated region of the polymer, leading to reduced by-product formation and other desirable features. This catalyst has particular usefulness in reactions or processes sensitive to high acidity, e.g., esterification-transesterification.

25 Claims, 3 Drawing Sheets

(56) References Cited

U.S. PATENT DOCUMENTS

| | | | |
|---|---|---|---|
| 4,698,186 A * | 10/1987 | Jeromin et al. | 554/174 |
| 4,698,188 A | 10/1987 | Jeromin et al. | |
| 4,824,998 A * | 4/1989 | Inoue et al. | 560/205 |
| 5,012,031 A * | 4/1991 | Schleppinghoff et al. | 585/639 |
| 5,132,478 A | 7/1992 | Ho et al. | |
| 5,196,612 A * | 3/1993 | Ward | 568/697 |
| 5,233,096 A * | 8/1993 | Lundquist | 568/727 |
| 5,308,365 A | 5/1994 | Kesling, Jr. et al. | |
| 5,413,634 A | 5/1995 | Shawl et al. | |
| 5,414,152 A | 5/1995 | Cipullo | |
| 5,426,199 A | 6/1995 | Lundquist | |
| 5,723,687 A | 3/1998 | Marchlonna et al. | |
| 6,133,190 A | 10/2000 | Wehmeyer et al. | |
| 6,329,555 B1 | 12/2001 | Aron et al. | |
| 6,740,684 B2 | 5/2004 | Paliuras et al. | |
| 7,132,575 B2 * | 11/2006 | Carvill et al. | 568/727 |
| 7,161,053 B2 | 1/2007 | Beckmann et al. | |
| 7,488,837 B2 | 2/2009 | Tsuto et al. | |
| 2005/0043573 A1 | 2/2005 | Ramprasad et al. | |
| 2007/0004590 A1 | 1/2007 | Furuta | |

FOREIGN PATENT DOCUMENTS

| | | |
|---|---|---|
| DE | 882091 | 7/1953 |
| EP | 1508556 A1 | 2/2005 |
| EP | 1785478 A4 | 8/2009 |
| WO | WO-98/25876 | 6/1998 |

OTHER PUBLICATIONS

McMaster, L.P. et al., Preparation and characterizatin of a modified ion-exchange resin, 1972, Ind. Eng. Chem. Prod. Res. Develop., vol. 11, No. 1, pp. 97-105, (9 pages).*

Dorwald F.A., Side Reactions in Organic Synthesis, 2005, Wiley: VCH, Weinheim pp. 1-15.*

Chakrabarti, A. et al., Cationic Ion Exchange Resins as catalyst, 1993, Reactive Polymers,, vol. 20, pp. 1-45.*

Wheaton R.M. et al., Industrial Applications of Ion Exchange Resins, 1958, vol. 35, No. 2, pp. 59-65.*

Rohm & Haas, Amberlyst 121 & Amberlyst 131, 2006 & 2001, (abstract) 3 pages.*

Honkova, L., et al., Relation between functionalizatin degree and activity of strongly acidic polymer supported catalysts, 2005, Reactive & Functional Polymers, vol. 66, pp. 592-598.*

Kunz, U., et al., Improvement of active site accessibility of resin catalysts by polymr/carrier composites: development and characerisation of monolithic catalytic chromatographic reactors, 2001, Journal of Molecular Catalysis A: Chemical, vol. 177 pp. 21-32.*

Davankov, V. A. et al.; Macronet Isoporous Gels Through Crosslinking of Dissolved Polystyrene; J. Polymer Sci.; Symposium No. 47; 1974; pp. 95-101.

Widdecke H.; Design and Industrial Application of Polymeric Acid Catalysts; 1988; Title Page, Index, pp. 149-179; edited by D. C. Sherrington and P. Hodge; John Wiley & Sono Ltd.

Hypersol-MacronetTM Sorbent Resins; Purolite Technical Bulletin; 1998; (15pp).

PCT Search Report; International Searching Authority; Dec. 29, 2008; (4pp).

Blagov S. et al., "Influence of ion-exchange resin catalysts on side reactions of the esterification of n-Butanol with acetic acid", Chemical Engineering Science, Oxford, GB, vol. 61, No. 2, pp. 753-765 (2006).

Honkela M. L. et al., "Comparison of ion-exchange resin catalysts in the dimerisation of isobutene", Applied Catalysis A: General, Elsevier Science, Amsterdam, NL, vol. 295, No. 2, pp. 216-223 (2005).

European Search Report mailed Mar. 16, 2012, which issued in corresponding EP Application No. 08841599.7.

* cited by examiner

CONTROLLED CATALYSIS

CROSS-REFERENCE TO RELATED APPLICATIONS

This application claims priority to U.S. Provisional Patent Application No. 60/983,093, filed Oct. 26, 2007, herein incorporated by reference in its entirety.

FIELD OF THE INVENTION

The present invention relates to catalyzed reactions using a heterogeneous catalyst. The use of the ion exchange resins (IEX) described herein suppresses by-product formation, improves reaction control, increases catalyst lifetimes, and extends production runs. This is accomplished by employing partially sulfonated resins.

BACKGROUND OF THE INVENTION

The use of heterogeneous, ion-exchange resins as catalysts was recognized before the development of modern styrenic resins. Cottle (U.S. Pat. No. 2,678,332; issued 11 May 1954, filed 23 Dec. 1949) employed sulfonated phenol-formaldehyde resins and even sulfonated coal for esterification, in which the reactants were an olefin with an organic acid. Indeed, there had been work at I.G. Farbenindustrie, BASF, in Germany during World War II using resins as catalysts [DE 882,091 (1942); DE 866,191 (1944), DE 868,147 (1944)] but these were not published until around 1952.

Universally, there are three target properties for any commercially-useful catalyst: (a.) increased activity, (b.) reduced by-product formation, due to side and/or further reaction(s), and (c.) longer catalyst lifetimes leading to (d.) longer process runs. Aries dealt with the first two of these issues: U.S. Pat. No. 3,053,887 (issued 11 Sep. 1962, filed 3 Nov. 1959) describes the alkylation of carboxylic acids with olefins, to produce tertiary-alkyl esters. Resins of low porosity (i.e., styrenic gel resins) were not effective catalysts, but styrenic macroporous resins (e.g., Duolite C-25) were. And, Aries succeeded in suppressing the well-known, competitive polymerization of the olefin (iso-olefin, isobutylene: self alkylation): having found effective catalysts, he was then able to carry out the reaction at lower temperatures.

Five factors are crucial for effective reaction:
A. compatibility of the reagents—e.g., when trying to contact a very hydrophilic species with a very hydrophobic one (a classic example being aqueous cyanide ion with a larger alkyl halide),
B. compatibility of the catalyst or catalytic sites with all the required reagents for reaction—i.e., solubility of the reagents in the microenvironment of the catalytic sites,
C. accessibility of the catalytic sites to all the required reagents: the rates of diffusion of the reagents to the catalytic sites—e.g., large molecules versus small ones, the available surface area of the catalyst, and the crosslinking in the gel region of a resin,
D. permeation of the product(s) out of the catalyst,
E. and obviously, the activity of the catalytic group itself—e.g., strong versus a weak acids.

Conceptually, factor A. can be subsumed into B. when the catalysis is heterogeneous.

In the esterification of carboxylic acid with alcohols rather than olefins, another side reaction, ether formation, can prove troublesome.

Similar side reactions can occur in transesterification: (1) ether formation, (2a) dehydration to olefin(s), as well as (2b) polymerization thereof.

A number of researchers have attempted to provide improved, useful heterogeneous catalysts. For example, U.S. Pat. No. 3,678,099 (Kemp, issued 18 Jul. 1972, filed 26 Jun. 1970) describes an IEX catalyst exchanged with metal salts for olefin esterification, as did U.S. Pat. No. 3,278,585 (Baker, issued 11 Oct. 1966, filed 8 Aug. 1962) for alcohol esterification. WO98/25876 (Young, Int. Pub. Date of 18 Jun. 1998, priority of 12 Dec. 1996) describes an IEX catalyst for gas phase esterification. U.S. Pat. No. 4,332,738 (Benitez, issued 1 Jun. 1982, filed 24 Nov. 1980) discloses a macroreticular (i.e., macroporous) IEX catalyst for the esterification of neo acids with alcohols; and U.S. Pat. No. 4,698,186 (Jeromin; issued 6 Oct. 1987, filed 21 Jan. 1986) describes IEX catalysts for pre-esterification of acids in fats. However, each of these catalysts are limited. For example, some of these catalysts are useful for only a limited range of materials, a limited range of reaction conditions, and still too much side products or by-products are formed, or the catalyst is not sufficiently stable, long-lived, and/or not economically effective.

U.S. Pat. No. 5,426,199 (Lundquist, issued 20 Jun. 1995, initially filed 13 Dec. 1991) describes the catalyzed esterification of an alcohol with an acid or an ester (transesterification). The esterification process involves contacting an organic acid or ester with an alcohol in the presence of crosslinked, vinylaromatic copolymer beads which have an inner volume of unfunctionalized polymer and a surface layer functionalized with strongly acidic functional groups. Such resins have been denoted as having a "shell-core" morphology. The total cation-exchange capacity is from about 0.1 to about 2.5 meq/$g_{dry}$ which, taking into consideration the ethylvinylbenzene in commercial divinylbenzene, calculates to ca. 1 to 33% functionalization. The resin catalysts are produced from gel or macroporous copolymers by sulfonating, according to the previous U.S. Pat. No. 3,242,921 (Hansen, issued 24 May 1966, filed 18 Mar. 1965), only the surface layer.

Lundquist's theorized that with fully sulfonated resins, the surface groups are accessible to essentially all reactants, while those deeper within the polymeric matrix are accessible only to (a) small, (b) polar reactants. Therefore, small, polar, organic alcohols partition themselves within the interior of the resin matrix and preferentially form (1) ethers through self condensation and/or (2) olefinic by-products through dehydration. Widdecke ["Design and Industrial Application of Polymeric Acid Catalysts," Chapter 4, p. 166; D. C. Sherrington and P. Hodge, editors, *Syntheses and Separation using Functional Polymers*, John Wiley & Sons Ltd., Chichester (1988)] had also used a surface sulfonated resin. However, Widdecke taught that: the reaction of the non-polar reagent will be restricted mainly to the surface active groups, while the undesired reaction (formation of dimethyl ether from methanol) will take place within the microspheres or "microphase."

The need for catalysts that produce less and/or fewer by-products has been recognized in the art for a goodly time, now. Lundquist's approach addressed incompatibility or partitioning effects. However, there are other issues or factors, such as fouling, thermal de-sulfonation, acidity, crosslinking and its effects, etc. Additionally, there is need for good, effective methods to produce such resins, efficiently, economically, and environmentally.

All U.S. patents and publications cited herein are hereby incorporated by reference. In the event of differing terminology or disclosure, that of the present specification controls.

SUMMARY OF THE INVENTION

According to one embodiment of the present invention, processes are provided for catalyzed reactions that produce less by-products as compared to reactions catalyzed with thoroughly sulfonated resins. The IEX resin catalyst is partially sulfonated; the functional groups are more available-accessible to a spectrum of reagent molecules: in particular, those that are relatively hydrophobic, along with those that are relatively hydrophilic. In one embodiment the resin is partially sulfonated, essentially uniformly, throughout the bead.

One embodiment provides a method of catalyzing a reaction comprising: selecting a first reactant and a second reactant(s), and combining the first reactant, the second reactant, and a Bronsted-acid resin catalyst; and carrying out the reaction to form a product; wherein the Bronsted-acid resin catalyst is an ion exchange resin that is sulfonated in one or more functionalized regions, wherein each region is only partially sulfonated. The degree of sulfonation is less than 75% of the aromatic rings of the resin. In one embodiment, The degree of sulfonation is less than 51% of the aromatic rings of the resin. In one embodiment, a third reactant is combined with the first and the second reactant. In another embodiment, additional reactants are also added.

One embodiment provides a method of catalyzing a reaction comprising: selecting a first reactant and a second reactant(s), and combining the first reactant, the second reactant, and a Bronsted-acid resin catalyst; and carrying out the reaction to form a product; wherein the Bronsted-acid resin catalyst is an ion exchange resin that is sulfonated throughout the polymeric resin matrix comprising aromatic rings. The degree of sulfonation is less than 75% of the aromatic rings of the resin. In another embodiment, the degree of sulfonation is less than 51% of the aromatic rings of the resin. In one embodiment, a third reactant is combined with the first and the second reactant. In another embodiment, additional reactants are also added.

In one embodiment, the degree of sulfonation for the resin catalysts as describe above is less than 51%. In another embodiment, the degree of sulfonation is less than 40%, or even more preferred, less than 33%, or even more preferred, less than 25%, or, in some embodiments depending on the reaction to be catalysed, even more preferred, less than 20% sulfonated.

In particular, one embodiment provides for the esterification of olefins or alcohols using a partially sulfonated ion exchange resin catalyst as described herein. In another embodiment, the reaction is transesterification. Preferably, each reactant is independently a $C_1$ to $C_{24}$ alcohol or $C_1$ to $C_{24}$ olefin or a $C_1$ to $C_{24}$ organic acid or $C_2$ to $C_{76}$ organic ester. In one embodiment, a triglyclceride is a reactant. In one embodiment, the first reactant and the second reactant are the same.

In one embodiment of the present invention, the product can be an olefin oligomer, and the first and second reactants are independently $C_2$ to $C_{10}$ compounds. In another embodiment, the present invention provides a method of forming an ether comprising using the partially sulfonated catalyst of the present invention. One such ether is methyl tert-butyl ether. In another embodiment, the present invention provides a method of forming a polyether comprising using the partially sulfonated catalyst of the present invention.

In another embodiment, the present invention provides a method of forming a bisphenol comprising using the partially sulfonated catalyst of the present invention. In one embodiment, the reactants are a $C_6$ to $C_{20}$ phenolic compound and a $C_1$ to $C_{24}$ carbonyl compound.

In another embodiment, the present invention provides a method of forming an alkylphenol (i.e., C-alkylation) comprising using the partially sulfonated catalyst of the present invention. In one embodiment, the reactants are a phenol and an olefin. In one embodiment, the phenol is a $C_6$ to $C_{20}$ phenolic compound and the olefin is a $C_1$ to $C_{24}$ olefin.

In one embodiment, the alkylphenol is a para-substituted alkylphenol. In one embodiment, the alkylphenol is produced with fewer dialkylphenol side products. In one embodiment, the method comprises using only a single step. In another embodiment, the present invention provides a method of forming a phenol ether (i.e., O-alkylation) comprising using the partially sulfonated catalyst of the present invention. In one embodiment, the phenol ether is formed with less than 25% C-alkylated side product. In an even more preferred embodiment, the phenol ether is formed with less than 10% of the C-alkylated side product.

In another embodiment, the present invention provides a method of olefin oligomerization comprising using the partially sulfonated catalyst of the present invention. In one embodiment, the oligomerization occurs with less than a 25% trimerization or higher-order oligomerization. In a particularly preferred embodiment, the oligomerization occurs with less than a 10% trimerization or higher-order oligomerization. In one embodiment, the product olefin is an iso-olefin. In another embodiment, the reactants are independently $C_2$ to $C_{10}$ compounds. In a more preferred embodiment, the reactants are independently $C_4$ to $C_{10}$ compounds.

In another embodiment, the method comprising forming the catalyst by contacting a copolymer having aromatic groups with a solvent that swells or permeates the bead, (wherein the swelling or permeating may be full or partial); sulfonating to form a Bronsted-acid resin catalyst wherein 75% or less of the aromatic groups are sulfonated, throughout, whether the whole bead, a portion or a layer, to form a catalyst, and then using the catalyst for the reactions as discussed hereinabove. In one embodiment, the solvent is preferably a mostly-inert solvent. Even more preferably, the solvent is methylene chloride, or similarly behaving media (e.g., ethylene dichloride, propylene dichloride).

In another embodiment, the method comprising forming the catalyst by contacting a copolymer having aromatic groups with a solvent that swells or permeates the bead, (wherein the swelling or permeating may be full or partial); sulfonating to form a Bronsted-acid resin catalyst wherein 75%, or more particularly 51% or less of the aromatic groups are sulfonated, essentially uniformly throughout the how bead form a catalyst, and then using the catalyst for the catalytic reactions.

In one embodiment, the Bronsted-acid resin catalyst is a macroporous resin. In an even more preferred embodiment, the macroporous resin contains macropores having an average diameter of at least 750 Angstroms. In a particularly preferred embodiment, the macroporous resin catalyst has appreciable porosity greater than 10,000 Angstroms.

In one embodiment, the Bronsted-acid resin catalyst is a Macronet resin. The distinctive morphology of this catalyst helps compatibilize the reagents, thereby further facilitating the reaction. Preferably, the Macronet resin has a controlled, selected, permanent, micropore structure.

In one embodiment, the Bronsted-acid resin catalyst is a gel resin.

Another aspect of the present invention provides a process comprising using a catalyst in a chemical reaction wherein the catalyst is a Bronsted-acid resin catalyst wherein 75% or less of the aromatic groups are sulfonated, wherever located in the polymeric bead or matrix. In one embodiment, extended runtime is due to higher product quality. In another embodiment, it is due to extended catalyst lifetime. In another aspect of the present invention, the catalytic reaction has increased fouling resistance, resulting in reduced catalyst replacement costs and/or extended process runtimes. In yet another aspect of the present invention, the catalyzed chemical reaction(s) are better or more easily controlled, removing the requirement for expensive, complicated (possibly multi-stage), equipment and processes.

In one embodiment, using a catalyst in a chemical reaction includes the steps of mixing the catalyst with one or more reactants and optionally one or more solvents, starting reaction conditions (e.g., heating or changing the pressure in the reaction vessel), reacting and collecting the product. In one embodiment, the 51% or less sulfonated groups are located in one or more partially sulfonated regions. In one embodiment, the degree of sulfonation, averaging the one or more regions of partial sulfonation, is less than 40%, or even more preferred less than 33%, or even more preferred, less than 25%, or even more preferred, less than 20%, or, in some embodiments even more preferred, less than 15% sulfonated.

In particular, one embodiment provides for the esterification of olefins or alcohols using the partially sulfonated ion exchange resin catalyst as described herein. In another embodiment, the reaction is the transesterification. In one embodiment, each reactant is independently a $C_1$ to $C_{24}$ alcohol or $C_1$ to $C_{24}$ olefin or a $C_1$ to $C_{24}$ organic acid or $C_2$ to $C_{76}$ organic ester. In one preferred embodiment, a triglyclceride is a reactant. In another embodiment one reactant is soy or rapeseed oil. In one embodiment, the first reactant and the second reactant are the same. In one embodiment, the product is an olefin oligomer, and the first and second reactants are independently $C_2$ to $C_{10}$ compounds. In another embodiment, the present invention provides a method of forming an ether comprising using the partially sulfonated catalyst of the present invention. A preferred ether is methyl tert-butyl ether. In another embodiment, the present invention provides a method of forming a polyether comprising using the partially sulfonated catalyst of the present invention. In another embodiment, the present invention provides a method of forming a bisphenol comprising using the partially sulfonated catalyst of the present invention. In one embodiment, the reactants are a $C_6$ to $C_{20}$ phenolic compound and a $C_1$ to $C_{24}$ carbonyl compound. In another embodiment, the present invention provides a method of forming an alkylphenol (i.e., C-alkylation) comprising using the partially sulfonated catalyst of the present invention. In one embodiment, the reactants are a phenol and an olefin. In one embodiment, the phenol is a $C_6$ to $C_{20}$ phenolic compound and the olefin is a $C_1$ to $C_{24}$ olefin.

In one embodiment, the alkylphenol is a para-substituted alkylphenol. In one embodiment, the alkylphenol is produced with fewer dialkylphenol side products. In one embodiment, the method comprises using only a single step. In another embodiment, the present invention provides a method of forming a phenol ether (i.e., O-alkylation) comprising using the partially sulfonated catalyst of the present invention. In one embodiment, the phenol ether is formed with less than 25% C-alkylated side product. In an even more preferred embodiment, the phenol ether is formed with less than 10% of the C-alkylated side product.

In another embodiment, the present invention provides a method of olefin oligomerization comprising using the partially sulfonated catalyst of the present invention. In one embodiment, the oligomerization occurs with less than a 25% trimerization or higher-order oligomerization. In a particularly preferred embodiment, the oligomerization occurs with less than a 10% trimerization or higher-order oligomerization. In one embodiment, the product olefin is an iso-olefin. In another embodiment, the reactants are independently $C_2$ to $C_{10}$ compounds. In yet another embodiment, the reactants are independently $C_4$ to $C_{10}$ compounds. In one embodiment, the reaction is isobutylene oligomerization.

In another embodiment, the method comprising forming the catalyst by contacting a copolymer having aromatic groups with a solvent that swells or permeates the bead, (wherein the swelling or permeating may be full or partial); sulfonating to form a Bronsted-acid resin catalyst wherein 51% or less of the aromatic groups are sulfonated to form a catalyst and then using the catalyst for the reactions as disclosed hereinabove. Preferably, the solvent is a mostly-inert solvent. Even more preferably, the solvent is methylene chloride.

In one embodiment, the Bronsted-acid resin catalyst is a macroporous resin. In one particular embodiment, the macroporous resin contains macropores having an average diameter of at least 150 Angstrom, or even more preferably 750 Angstroms. In one particular embodiment, the macroporous resin catalyst has appreciable porosity greater than 10,000 Angstroms.

In one embodiment, the Bronsted-acid resin catalyst is a Macronet resin. The distinctive morphology of this catalyst helps compatibilize the reagents, thereby facilitating reaction. Preferably, the Macronet resin has a controlled, selected, permanent, micropore structure.

In one embodiment, the Bronsted-acid resin catalyst is a gel resin. In another embodiment, the solvent that swells the resin for sulfonating the resin is a mostly-inert solvent such as methylene chloride.

DETAILED DESCRIPTION

Resins

The resins used as the Bronsted acid catalyst of the present invention may be a gel or macroporous. In one embodiment, a macroporous resin is preferred. Macroporous resins have permanent porosity (i.e., "permanent" "macroporosity," as the terms are used in IEX). In another embodiment, a Macronet resin is particularly preferred. Macronets have permanent microporosity with or without permanent macroporosity.

The resins useful in the present invention include crosslinked polymeric alkenylaromatic resins such as polystyrene copolymer resins. Preferably, the resins are formed having 1-80%, or more commonly 1-25% (by weight) of a crosslinking agent such as divinylbenzene.

The pores in the macroporous resins, as described herein, can be formed to have various sizes. The pore sizes can be varied by modifying the synthesis parameters, as is known in the art. Further, the resin can be formed with varying pore density (i.e., "light sponge" to "heavy sponge" as needed). Macroporous resins have high surface areas, due to the internal surface of the pores throughout the bead, typically circa 40 m$^2$/g$_{dry}$, whereas the outer surface of the bead has <1 m$^2$/g$_{dry}$, which is what gel resins show.

In one embodiment, the macroporous resins (i.e., "Orthoporous Resins") have exceptionally large pores, compared to common macroporous resins. Pore size affects diffusion and flow kinetics within the resin bead. Therefore, the catalytic rates may be increased compared to other resins having smaller pores, depending on the application. Orthoporous resins have appreciable porosity of pores greater than 10,000 Angstroms (1 micron). As used herein "appreciable" porosity means at least 0.05 ml/g$_{dry}$ or more preferably 0.10 ml/g$_{dry}$.

In another embodiment, the resin of the present invention is a Macronet [Davankov et al., *The Journal of Polymer Science*, Symposium No. 47, pages 95-101 and 189-195 (1974), and Purolite Technical Bulletin "*Hypersol-Macronet™ Sorbent Resins*," The Purolite Co. (PA), pp. 1-11 (1995)]. Macronet resins are produced by post-crosslinking to provide a stable, rigid, "permanent" micropore structure. They may be formed for example, by hypercrosslinking (a.) linear polystyrene in solution or (b.) crosslinked styrenic copolymers in the swollen state, under Friedel-Crafts conditions. [See Davankov; U.S. Pat. No. 3,729,457.] Some resins relevant to the present invention include commercial resins, for example MN-500, MN-502.

Particularly useful are resins with selected, permanent, micropore structures. These resins have a controlled pore size below 50 Angstroms in diameter, or more preferably below 30 Angstroms.

In another embodiment, the resin is a gel resin. Gel resins are glassy-transparent beads that swell in the presence of good solvents. Generally, gel resins are considered as being homogenously crosslinked without "permanent" macropores or micropores.

Partially Sulfonated Resins

The resins described herein are Bronsted acid, proton-donor resins having reduced sulfonation. It is posited that this achieves not merely a lower quantity of sulfonic acid groups but, more decisively, a decrease in protonation power, thereby reducing deleterious (a) side reactions and/or (b) further reactions. With thorough or high sulfonation of even an external surface layer and/or the internal surface of the polymeric macropores, highly acidic arrays or clusters of sulfonic acid groups can form, just as with high sulfonation throughout the entire bead.

In addition, for some resins—e.g., the Macronets—the rigid microporosity can be used to restrict the sulfonic acid groups and thereby also inhibit their cooperating together catalytically or forming highly acidic arrays.

The partial distribution of the sulfonic acid groups can be achieved by using a solvent that also swells or permeates the beads and also in which the sulfonating agent is soluble. The solvent may swell the bead completely or only partially, as long as it allows the sulfonating agent to permeate throughout the polymeric matrix, to be sulfonated. [See Wheaton; U.S. Pat. No. 3,133,030; issued 12 May 1964, filed 22 Aug. 1960.]

In one embodiment, the resins are uniformly partially sulfonated through the entire bead. Thus, the exterior surfaces of the bead, the internal pore surfaces in the interior of the bead itself are uniformly sulfonated. The term uniformly sulfonated means that the density of sulfur groups throughout the uniformly sulfonated region is substantially the same. Preferably, the variation in sulfur (or other marker) density within the region will be within 25%. In one embodiment, the variation in sulfur density will be within 14%.

In another embodiment, the sulfonated resins have regions that are partially sulfonated and regions that are un-sulfonated. The resin is preferably uniformly sulfonated through the sulfonated region. Each resin bead may have one or more regions of sulfonation and one or more region that is not sulfonated. The term "region," as used herein means a portion of the bead, either on or near the surface, in the bead interior, or both at or near the surface and in the bead interior. Each region includes at least 10% of the bead volume. In one embodiment, each sulfonated or unsulfonated region includes at least 20% of the bead volume. In another embodiment, each sulfonated region expands through both the shell and the core of the bead. In yet another embodiment, a sulfonated region or regions are located solely on the surface of the bead, with optional additional sulfonated region(s) in the bead interior.

In one embodiment, a polymeric alkenyl aromatic copolymer is swollen with a mostly inert solvent. A mostly inert solvent is a one that is essentially chemically unreactive in the process. Methylene chloride is such a solvent for chlorosulfonic acid. The resin, solvent, and a chosen, limited amount of chlorosulfonic acid are (a) mixed at low temperature and (b) then heated to where reaction occurs. Reaction times are generally about ½-2 hours or longer. This process is described in detail in U.S. Pat. No. 3,133,030, herein incorporated by reference in its entirety. Numerous variants can be envisaged, following the principals of U.S. Pat. No. 3,133,030, and are applicable in the present invention.

It is contemplated for this invention that solvents other than methylene chloride and reagents other than chlorosulfonic acid, may be used to form the partially sulfonated resin. It is contemplated that other specific methods may be used or devised to achieve partial or limited sulfonation.

The phrase "partially sulfonated," however it is achieved, means throughout the whole bead or a region or portion of the bead. The sulfonic acid groups are distributed both at the surface and in the interior of the polymeric region, identified. That can range from a uniform to a gradient sulfonic acid density. The functional group distribution for the bead can be determined using SEM (scanning electron microscopy) with EDX (energy dispersive X-ray) analysis for sulfur or an exchanged metal ion on a cross section. resins used in the present invention are partially sulfonated resins, having up to 10%, 20%, 30%, 40%, 50%, 60%, or up to 75% of the sulfonic acid groups of a conventional, highly-sulfonated resin (i.e., nearly mono-sulfonated). Traditional, fully-functionalized, commercial resin will have a dry weight capacity up to 5.0 eq/kg; although, that becomes difficult to achieve with higher DVB crosslinking, probably due to the steric-hindrance-tightness of the polymeric matrix. In one embodiment, 51% or less of the aromatic groups are sulfonated. In another embodiment, 33% or less of the aromatic groups are sulfonated. In another embodiment, 20% of or less of the aromatic groups are sulfonated. In one embodiment, the resins have a dry-weight cation-exchange capacity of 2 to 70% of a conventional, fully-sulfonated resin. In one embodiment, the dry-weight cation-exchange capacity is between 2 to 50%, and in another embodiment, the dry-weight cation-exchange capacity is between 2 to 30% of a conventional, highly sulfonated resin.

Not wishing to be bound by theory, nonetheless, we hypothesize that because of site isolation, there are fewer arrays or clusters of sulfonic acid groups in these partially sulfonated resins. An array or cluster is a region with adjacent sulfonic acid groups, which can associate by hydrogen bonding. These (a) confer higher acidity and (b) allow cooperative effects catalytically. Regardless of any theory, the observed operational result of using the resins of the present invention is better reaction control generically.

The degree of sulfonation—or number of active sites, or ionizable groups, or exchangeable groups—on the resin can be determined by a number of techniques, well recognized in the art. Elemental analysis, for sulfur, is one; but this necessitates thorough combustion of the polymer; (1) exhaustive ion exchange or (2) neutralization are two other techniques, and much simpler: for example, a known weight or volume of the resin is titrated with sodium hydroxide, using a simple pH indicator or electrode. Analysis on shell-core beads gives a mass average, of the shell and core, and not the degree of substitution in the shell itself.

Catalyzed Reactions

The Bronsted acid catalysts as described herein can be employed for a number of reactions including esterification and transesterification, ether formation, polyether synthesis, bisphenol formation, alkylphenol formation, the formation of phenol ethers, and olefin oligomerization. Any reaction catalyzed by acidic resins may employ the catalysts of the present invention as long as that reaction does not require higher acidity—i.e., reactions where the partial sulfonation would render the resin catalytically inactive or inert in the system. As used herein, the phrase "using a catalyst in a chemical reaction" means that a first and a second reactant, where the first and second reactants may be the same, are combined with the catalyst and a reaction proceeds to form a product. The chemical reaction may be carried out in a continuous or batch-type process. In one embodiment, a fixed resin-catalyst bed is used; in another, a fluidized bed can also be used.

For some reagents, which resist protonation, higher temperatures can be used to compensate. However, the temperature must remain below that causing loss of significant catalytic activity of the resin due to de-sulfonation.

In one embodiment, the method comprises using a single step. In another embodiment, the first and the second reactants are the same.

The methods of the present invention are particularly useful in reactions where reaction control is an issue, that includes reactions where by-product formation, or catalyst lifetimes, or process run times, or process control (exotherms, pressures, etc.) can be an issue.

Few chemical transformations are free of side reactions or the sensitivity of products or by-products to further reaction. Some are troublesomely so. Thus, the methods described herein are particularly useful for these reactions. Such reactions include, but are not limited to olefin oligomerization, the formatin of bisphenols, and the formation of alkylphenols, The term "side product" means specifically any compound produced in a reaction occurring alongside the desired reaction (i.e., in a side reaction). As used herein, a "by-product" is a compound other than the desired product generated in the reaction, and may occur as well from further reactions of undesired or desired product(s); side products are included within by-products. For example, ethers and olefins are common side products formed during catalytic production of an ester. A reaction may produce more than one by-product. In one embodiment of the present invention, the reaction of the present invention will produce a product with less than 20% of by-products. Preferably, there will be less than 10% by-products, and more preferably, less than 5.0%. Even more preferably, the present invention will provide a product with less than 2.0% by-product. The reaction of the present invention will produce a product with less than 20% of side products. Preferably, there will be less than 10% side products, and more preferably, less than 5.0%. Even more preferably, the present invention will provide a product with less than 2.0% side product.

As used herein, a chemical reaction that is "better controlled" means that the physical parameters can be better controlled—i.e., heat evolution, gas formation, etc. One example of a better controlled reaction is a reaction having reduced by-product; another example of a better controlled reaction is a reaction having an extended runtime; another example of a better controlled reaction is a reaction wherein the catalyst shows increased lifetime compared to the same reaction using a fully-functionalized resin catalyst. In an exemplary embodiment, the catalyst lifetime is increased at least 20%; in another embodiment, the catalyst lifetime increased at least 40% compared to the same reaction using a fully-functionalized resin catalyst. In another exemplary embodiment, the reaction runtime increased at least 20%; in another embodiment, the reaction runtime increased at least 40% compared to the same reaction using a fully-functionalized resin catalyst.

Preferably, the methods of the present invention will have increased fouling resistance. Due to the increased fouling resistance, the catalyst lifetimes can be significantly greater than the catalyst lifetimes for other catalyst used in the same reaction. As used herein, the term "fouling resistance" means that the catalyst resists contamination that reduces catalyst activity caused by deposits forming within the catalyst matrix, or on the catalyst surface, or filling and narrowing of the catalyst pores. Preferably, the fouling resistance is at least 1.10 times that of the fully-sulfonated traditional catalysts. Even more preferably, the fouling resistance is at least 1.25 times that of fully-sulfonated traditional catalysts, or even more preferably 1.5 times.

Esters

In one embodiment of the present invention, the resin catalyst is used in the esterification of an organic acid and organic alcohol, or transesterification of an organic ester with an organic acid or alcohol. The esterification process may be any catalyzed esterification process which suffers from deleterious side reactions, such as the synthesis of dimethyl maleate.

The organic acid for the esterification or transesterification reaction is preferably a $C_1$ to $C_{24}$ mono-, di-, or polycarboxylic acid or ester; it may be a linear or branched, aliphatic or aromatic, saturated or unsaturated acid, or it may be an alkyl or aralkyl acid, again with the aliphatic portion being saturated, unsaturated, linear or branched. The organic acid may have one or more of its hydrogens substituted by halogen, nitro, or other similar groups. The corresponding anhydrides of these acids may be employed in the process of the present invention. The preferred acids have from two to twenty carbon atoms including the carboxyl carbon. Examples of such acids are acetic, propionic, butyric, valeric, caproic, caprylic, capric, stearic, oleic, linolenic, and arachidic acids, acrylic, methacrylic, crotonic, vinylacetic, and other unsaturated acids; oxalic, malonic, succinic, maleic, fumaric, itaconic, glutaric, adiptic, sebacic, citric, phthalic, isophthalic, terephthalic, trimellitic, pyromellitic, 1,2,3,4-butanetetracarboxylic, fumaric, tartaric, glycolic, malonic, and other similar polycarboxylic acids; benzoic, toluic, phenylacetic, diphenylacetic, cinnamic, hydrocinnamic, phenylpropionic and similar aromatic acids, substituted acids such as trifluoroacetic, fluoroacetic, chloroacetic, α-chloropropionic, methoxyacetic, β-ethoxypropionic, p-chlorobenzoic and 2,4-dichlorophenoxyacetic acids; and anhydrides such as acetic, propionic, butyric, maleic, stearic, succinic, benzoic, phthalic, pyromellitic, and naphthalic anhydrides, and pyromellitic dianhydride, and fatty acids of natural source or man-made.

The organic alcohols, for the esterification or transesterification reactions are preferably $C_1$ to $C_{24}$ linear or branched mono-, di-, or polyhydric alcohol. More specifically, the alcohol is linear or branched, aliphatic, aromatic, alkyl, or aralkyl hydrocarbons, and the preferred alcohols may have from one to twenty twenty-two carbon atoms. The alcohols may be primary, secondary or tertiary; they may be mono-, di- or polyols; and they may have one or more of their hydrogens substituted by halogen, nitro, ether or other similar groups, so long as these groups do not interfere, at the chosen reaction conditions, with the esterification reaction, as by causing competing reactions such as alcoholysis, hydrolysis or other hydrolytic displacement at the substituent group. In one embodiment, alcohol is a monohydric aliphatic alcohol a monohydric aromatic alcohol or a polyhydric alcohol. Examples of such alcohols are methanol, ethanol, n-propanol, isopropanol, butanols such as n-butanol; pentanols such as n-pentanol, isopentanol or cyclopentanol; hexanols such as n-hexanol, cyclohexanol or methyl isobutyl carbinol; heptanols, benzyl alcohol, octanols, lauryl alcohol, cetyl alcohol, stearyl alcohol, ethylene glycol, diethylene glycol, triethylene glycol, propylene glycol, dipropylene glycol, butylene glycol, 1,2,3,4-butanetetrol, glycerine, glycerol monomethyl ether, glycerol monoethyl ether, 1,5-pentanediol, 1,3,5-pentanetriol, pentaerythritol, 1,6-hexanediol, hexanetriols such as 1,2,6-hexanetriol; hexanetetrols, hexanehexyls such as dulcitol, mannitol and sorbitol; and branched analogs of any of the above, and fatty alcohols of natural source or man-made.

The organic ester for the transesterification reaction is preferably a $C_2$ to $C_{76}$ linear or branched ester of an aliphatic carboxylic acid or aromatic carboxylic acid or polycarboxylic acid, or a mixture thereof and a $C_1$ to $C_{24}$ linear or branched monohydric alcohol or polyhydric alcohol. More specifically, it may be, for example, an ester of a carboxylic acid such the acids discussed herein above or a dicarboxylic acid or a mixture thereof and a monohydric aliphatic alcohol such as methanol, ethanol, propanol, butanol, octanol and stearyl alcohol, a monohydric aromatic alcohol such as benzyl alcohol, or a polyhydric alcohol such as ethylene glycol, propylene glycol, glycerol, pentaerythritol, and sorbitol. Examples of such an ester include a natural vegetable oils such as monoglyceride, diglyceride, triglyceride, coconut oil, palm oil and palm-kernel oil, and animal oils such as a beef-tallow and a pork-lard.

The esterification process of one embodiment of the present invention involves contacting an organic acid with an alcohol and the partially sulfonated catalyst under reaction conditions.

In another embodiment, the resin catalyst is used for transesterification wherein (a) a starting ester is mixed with an alcohol, (b) a starting ester with a carboxylic acid, or (c) a starting ester with another ester, and the under reaction conditions.

Conventional methods of esterification can be used. For example, the starting ester and the starting alcohol can be continuously fed to a reaction-column charged with the sulfonated resin catalyst, or can be reacted in batch-wise in a reaction chamber. In addition, the reaction can be carried out under standard pressure and temperature. And the reaction may be run at increased pressure to, for example, accelerate alcohol liquefaction and increase reaction kinetics. The alcohol and acid or ester may be mixed in the presence of the partially sulfonated resin beads, or mixed and subsequently added to them, or the partially sulfonated resin beads may be added to the mixture. The reaction mixture may be heated to the reaction temperature prior or subsequent to mixing the reagents or contacting them with the partially sulfonated resin beads.

The reaction may be conducted with the reagents, the catalyst, and also an added solvent or solvents.

The reaction temperature for an esterification or transesterification is preferably at least about 60° C. Lower temperatures are possible; however, the reaction rate of the reaction is reduced at lower temperatures. For each catalyst and reaction type, the reaction temperature will be determined by the reaction rate required as well as the temperature where the catalyst de-sulfonates and/or decomposition begins to occur, as is generally understood in the art.

The esterification or transesterification reaction in the process of the present invention will proceed over a wide range of reactant ratios. For example, over an alcohol:ester or acid ratio range from about 0.5:1 to about 20:1 on a molar basis. The reaction is often favored, though, by an excess of the alcohol over the organic acid. When a higher purity of the ester product is desired, it is possible that an excess of the starting alcohol is fed so as to shift equilibrium to ester. Accordingly, a higher yield of high purity product can be obtained. Therefore, a preferred range for the ratio of alcohol: acid or ester is from about 1:1 to about 15:1 on a molar basis, and a still more preferred range is from about 2:1 to about 10:1 on a molar basis.

Because the esterification with an alcohol is an equilibrium reaction, the water produced during the reaction is preferably removed to favor formation of the ester. The water may be removed by boiling, distillation, adsorption with an adsorbing agent that is relatively non-reactive with the alcohol, organic acid or ester, or by other processes which will readily be apparent to those skilled in the art. One method of removing the water is maintaining the reaction temperature above the boiling point of water or a water azeotrope at the pressure employed, thereby allowing the water or water azeotrope to boil off continuously.

Further, in a different embodiment, a separate liquid by-product such as glycerol is generated as the reaction proceeds; this may be separated and removed continuously or intermittently.

Ethers

The reaction of olefins with alcohols to form ethers—MTBE being a well-known case—is quite similar to the reaction of olefins with carboxylic acids to form esters. The very same problems can occur: olefin polymerization and formation of the symmetrical ether from the alcohol. The use of high alcohol to olefin ratios can be used to minimize olefin polymerization, but that reduces overall yield. Thus, the present invention provides for improved ether formation.

Polyethers

Ethers of polyols have a number of important uses: reducing particulate emissions in diesel fuels (Kesling, U.S. Pat. No. 5,308,365), decreasing shrinking and cracking in cements (Shawl, U.S. Pat. No. 5,413,634), lubricating fibers, as wetting agents and detergents (Blake, U.S. Pat. No. 2,934, 670), or precursors therefore. The Bronsted acid catalysts as described herein are applicable for the catalytic formation of polyethers.

Bisphenols

In another embodiment of the present invention, the Bronsted acid catalyst described in the present invention may be used for the condensation of phenols with aldehydes or ketones. Bisphenols are prepared by the reaction of a carbonyl compound with stoichiometric excesses of a phenolic compound as described, for example, in U.S. Pat. No. 6,740, 684 and in the references cited therein. The use of acidic cation exchange resins to catalyze these reactions is long known [U.S. Pat. No. 3,242,219; (Farnham, issued 2 Mar. 1966, filed 31 Dec. 1957), U.S. Pat. No. 3,049,569 (issued 14 Aug. 1962, filed 20 Oct. 1958), both assigned to Union Carbide Corp.]. Thus, the use of the catalysts of the present invention combined with the known processes for forming bisphenols offers a method having reduced by-products compared to other reactions, including a reaction using a fully sulfonated resin. Among the by-products not produced or produced to a lesser extent in the present reaction are organic tars which block, foul, and deactivate the catalyst (See Melby; U.S. Pat. No. 4,051,079) as well as contaminating the desired product (See Konrad; U.S. Pat. No. 4,107,218; issued 15 Aug. 1978, filed 6 May 1977).

The phenolic compounds used in the present invention preferably have 6-20 carbon atoms. Preferred phenolic compounds are unsubstituted in para position and optionally substituted in the ortho- and/or meta-position with one or more non-reactive groups, such as alkyl or halo. Preferred phenolic compounds are those substituted with one or more halogen or $C_{1-8}$-alkyl, preferably methyl, ethyl or tertiary butyl. Examples include phenol, mono-, di-, tri- or tetraalkylphenols, such as o-cresol or m-cresol; o-sec-butylphenol, o-tert-butylphenol, 2,6-dimethylphenol, 3,5-dimethylphenol, 2-methyl-6-tert.butylphenol, 2-isopropyl-5-methyl-phenol, 5-isopropyl-2-methyl-phenol, 2-methyl-6-ethylphenol, 2,3,6-trimethylphenol, 2,3,5,6-tetramethylphenol, 2,6-di-tertiary-butylphenol, 3,5-diethylphenol, or 2-methyl-3,5-diethyl-phenol; dichloride-phenols, or bromophenols, such as o-bromophenol.

The carbonyl compound employed for producing the bisphenol can be a ketone or an aldehyde. Preferred carbonyl compounds are those having one or two aliphatic, cycloaliphatic, aromatic or heterocyclic group attached to the carbonyl moiety having 1-8 carbon atoms. These groups are optionally halogenated. Alternatively, the carbonyl may be part of an aliphatic ring.

Examples of suitable ketones include, for example, acetone, 1,3-dichloroacetone, methyl ethyl ketone, diethyl ketone, dibutyl ketone, methyl isobutyl ketone, cyclohexanone, fluorenone, preferably 9-fluorenone, propiophenone, methyl amyl ketone, mesityl oxide, cyclopentanone or acetophenone. Examples of suitable aldehydes include formaldehyde, acetaldehyde, propionaldehyde, butyraldehyde and benzaldehyde. In one embodiment, the carbonyl compound is acetone.

The phenolic compound and the carbonyl compound are preferably reacted at a temperature of from 35 to 100° C., more preferably from 40 to 90° C., most preferably from 45 to 85° C.

In one embodiment a "promoter," 3-mercaptopropionic acid or the organic ester thereof, is added as well to the reaction mixture to further slow the rate of deactivation of the resin over time (Cipullo; U.S. Pat. No. 5,414,152).

Alkyl Phenols (C-Alkylation)

Alkylphenols, in particular para-alkylphenols, are valuable starting materials for the manufacture of detergents, dyes, pesticides, pharmaceuticals, emulsifiers, dispersing agents, stabilizers, antioxidants, plasticizers, corrosion inhibitors, disinfectants, seed dressings, anti-aging agents, plant protection agents, and perfumes. Preferred alkylphenols of the present invention are phenols or substituted phenols attached to an alkyl chain or substituted alkyl chain having 1 to 20 carbon atoms. A problem particular with the catalyzed alkylphenol production is the large amounts of heat evolving during the exothermic reaction between phenols and olefins. Local overheating due to the strongly exothermic reaction can result in contaminated and especially in discolored alkyl phenols which are unsuitable for further use, and the excessive heat can also damage the catalyst.

U.S. Pat. No. 4,198,531 (Merger, issued 15 Apr. 1980, foreign application priority 14 Jun. 1975) teaches the use of (1) fine-particle, (2) gel IEX resin (3) suspended in the reaction mixture. However, this reaction is limited to batch reactions and requires the use of a fine particulate resin. U.S. Pat. No. 4,168,390 (Alfs, issued 18 Sep. 1979, German application priority 14 Sep. 1973) provides a two-stage process or reactor, using IEX catalysts which uses 0.50-0.95 eq/liter catalyst at 80-120° C. for the $1^{st}$ stage and 1.0-1.8 eq/liter at 110-130° C. for the $2^{nd}$ stage. A reduced acid capacity was achieved by exchanging with $Al^{3+}$ ions. However, this reaction also is limited to processes where two stages can be used, adding substantial reaction time and costs to the process.

Other problems associated with the catalyzed production of alkylphenols are the production of other alkylphenols and dialkylphenols. For example, U.S. Pat. No. 4,461,916 (Alfs, issued 24 Jul. 1984; German application priority 29 Dec. 1981), describes the bi-products of the alkylation of diisobutene as including include para-t-butylphenol (from cleavage of diisobutylene and/or disproportionation of the initially formed octylphenol) and dialkylphenols. The butylphenol bi-product production can be reduced by adding water which suppresses the formation of the butylphenol. However, this slows the reaction velocity greatly at 100-105° C. and increases the disproportionation of undesired dialkylphenols. Another known method of reducing bi-product formation is by using a regular resin at higher temperature (i.e., 115-130°) with water present, but with the addition of a second stage; so, overall, the reaction comprises conducting the initial reaction and then react the dioctylphenol by-product within phenol in another reactor to obtain p-t-octylphenol. Again, such a process is problematic in that it is limited to two stages, which add substantial reaction time and cost to the process.

Thus, the present invention provides a catalyzed reaction that can be performed more inexpensively than current reaction. The present invention also provides improved space-time yields, longer resin life, higher purity, and no need for the expensive separation of mixtures of O- and multi-alkylated products or recycling.

Phenol Ethers (O-Alkylation)

Phenyl alkyl ethers are valuable, for use as solvents for organic residues and are particularly good for dissolving resinous varnish-like deposits formed in crank-cases. They are also used as antioxidants, heat-transfer agents, and ingredients in perfumes.

U.S. Pat. No. 4,299,996 (Parlman, issued 10 Nov. 1981; filed 1 Mar. 1980) observed that in phenol alkylation with isobutylene, using a resin in the $H^+$ form gave only C-alkylation (100%, mono- plus di-alkylation) at 50° C. U.S. Pat. No. 4,447,652 (Kurek, issued 8 May 1984, filed 21 May 1982, Example-II) found the same at 100° C.; but when the resin was 20% in the $Na^+$ form (80% in the $H^+$ form), 75% O- and 19% C-alkylation occurred.

Thus, the effect of a catalyst too high in acidity is evident in this reaction. Therefore, the use of the catalyst resins of the present invention provides for improved products and processes for phenol ether formation.

Olefin Oligomerization

Dimerization of isobuylene yields diisobutene (2,4,4-dimethylpentene-1 and -2) which can be hydrogenated to isooctane, the sought-after fuel additive. Higher oligomers are also formed (mainly trimer and tetramer) which are not desirable for carburetor fuels because of their higher boiling points. Rearrangement of the diisobutene also occurs, giving less desirable $C_8$ isomers.

One approach has been to add moderators (i.e., MTBE, t-butanol, water) to control activity and selectivity of the catalyst or jointly produce ethers (Marchioness; U.S. Pat. No. 5,723,687). In another approach, U.S. Pat. No. 7,161,053 (Beckmann et al., issued 9 Jan. 2007, filed 6 Aug. 2003) showed that partially neutralizing the resin reduced higher oligomers and rearrangement.

Yet again, the effect of a catalyst too high in protonation power is found in this oligomerization reaction. Thus, improved products and processes are provided by using the catalyst resins of the present invention in these and like oligomerization reactions.

The terms "about," "approximately," "nearly," "essentially," etc., bear their common language meanings and are to be construed in the context of their use.

As used herein and in the appended claims, the singular forms "a," "an," and "the," include plural referents unless the context clearly indicates otherwise. Thus, for example, reference to "a molecule" includes one or more of such molecules, "a resin" includes one or more of such different resins and reference to "the method" includes reference to equivalent steps and methods known to those of ordinary skill in the art that could be modified or substituted for the methods described herein.

EXAMPLES

The following examples are included to demonstrate particular embodiments of the invention. It should be appreciated by those of skill in the art that the techniques disclosed in the examples, which follow, represent techniques discovered by the inventor to function well in the practice of the invention, and thus can be considered to constitute preferred modes for its practice. However, those of skill in the art should, in light of the present disclosure, appreciate that many changes and variations can be made in the specific embodiments which are disclosed and still obtain a like or similar result without departing from the spirit and scope of the invention.

Example-1

Comparative Resin Synthesis

Figure 1:
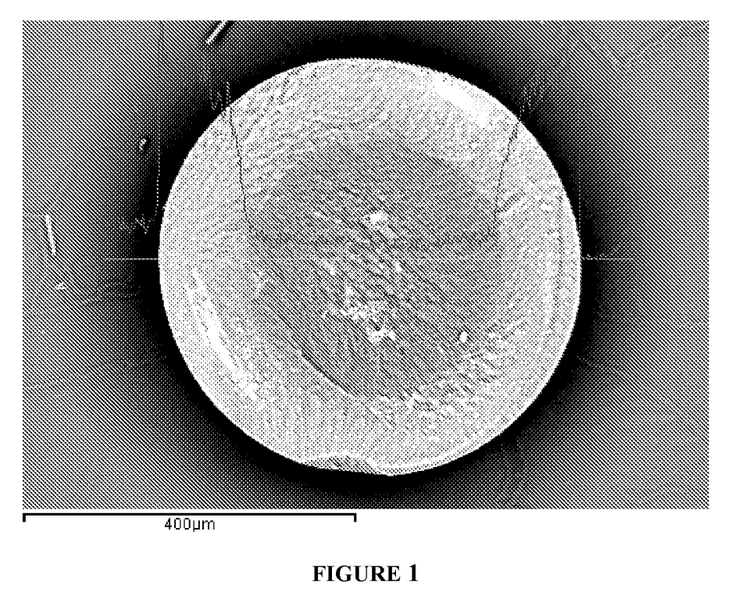
FIG. 1. Scanning electron micrograph (SEM) of a non-uniformly functionalized bead having shell-core morphology, including the sulfur line-scan distribution. The $H^+$ form of the resin had a dry weight capacity of 1.01 eq/kg.

A macroporous resin was prepared according to Example-2 of U.S. Pat. No. 5,426,199, using sulfuric acid with acetic acid, except at 80° C. rather than 50° C. The $H^+$ form of the resin had a dry weight capacity of 1.75 eq/kg. A bead cross section was imaged using scanning electron microscopy (see FIG. 1). The shell-core morphology is easily discernible visibly and also shown by the EDX sulfur line-scan (FIG. 1). Thus, the bead shows a non-uniform distribution: functional groups evident on the surface layer of the bead and none—or only a few—in the core.

Example-2

Comparative Resin Synthesis

Figure 2:
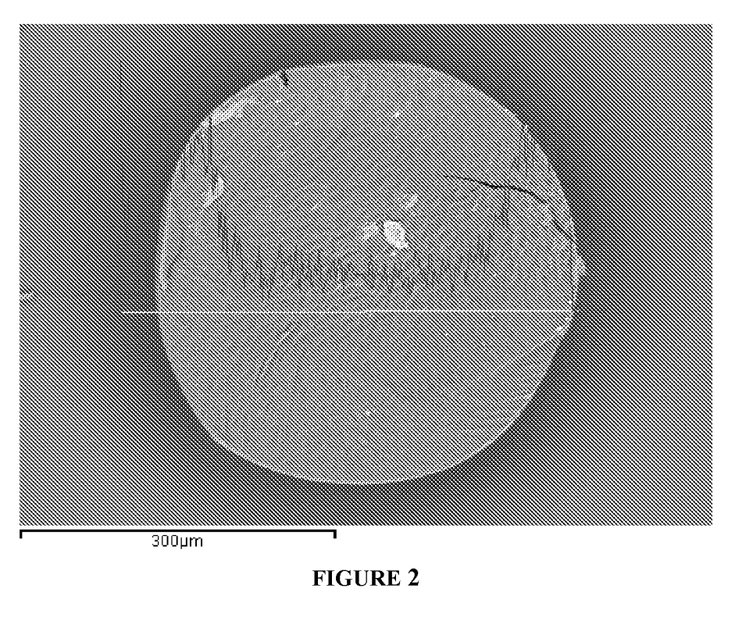
FIG. 2. SEM of a non-uniformly functionalized bead with shell-core morphology, including a sulfur line-scan distribution. The $H^+$ form of the resin had a dry weight capacity of 0.31 eq/kg.

A macroporous resin was sulfonated (sulfuric acid with acetic acid at 50° C.) according to Example-2 of U.S. Pat. No. 5,426,199. The $H^+$ form of the resin had a dry weight capacity of 0.31 eq/kg. The shell-core morphology, although not discernable visibly with this sample, is confirmed by the EDX sulfur line-scan (FIG. 2). Thus, this resin contains a non-uniform distribution: functionalized shell with unfunctionalized core.

Example-3

Resin Synthesis

Figure 3:
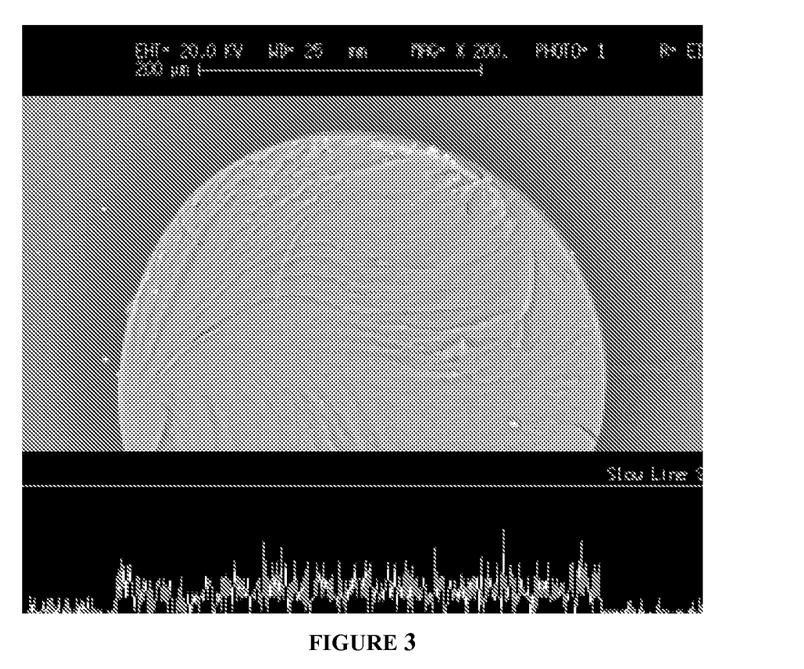
FIG. 3. SEM of a gel bead with partial substitution, and sulfur line-scan (below bead image).

A gel resin was prepared in accord with U.S. Pat. No. 3,133,030. The following being convenient on a laboratory scale: (a.) 100 g of dry copolymer was swollen in 800 ml methylene chloride for ca.1 hour, then chilled by holding above liquid nitrogen in a Dewar flask; (b.) chlorosulfonic acid was added and the mixture stirred for ca. 2 hr, (c.) the stirrer was stopped and the unabsorbed liquid siphoned from the bead mass, which (d.) then was allowed to warm to room temperature and stand over night. The $H^+$ for of the resin had a dry weight capacity of 1.48 eq/kg. The non shell-core morphology was established by the sulfur line-scan, across the bead section (FIG. 3, with a line-scan below).

Example-4

Resin Synthesis

Figure 4:
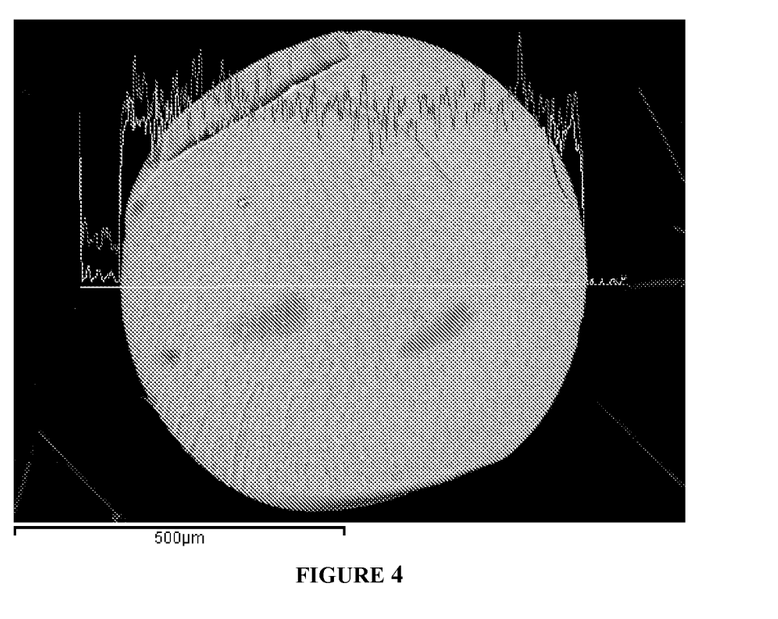
FIG. 4. SEM of a uniformly, partially sulfonated Macronet. Both sulfur (top) and cesium (bottom) line-scans show the same distribution.

A non-functional Macronet resin (Purolite Hypersol-Macronet™) was sulfonated according to the principles of U.S. Pat. No. 3,133,030 and as described for Example 3. The $H^+$ form of the resin had a measured dry weight capacity of 1.01 eq/kg. A sample of the resin was exchanged with cesium ion, and a cross section imaged (see FIG. 4). The atomic line scans for cesium and sulfur are provided. The Cs line-scan (bottom) as well as the S line-scan (top) show the same uniform substitution throughout.

Example-5

Resin Synthesis

Example-4 was repeated, giving essentially the same resin: dry weight capacity of 1.07 eq/kg.

Example-6

Resin Synthesis

Example-4 was repeated using more vigorous conditions. The measured dry weight capacity of the resin was 2.17 eq/kg.

Example-7

Performance Test Results, Transesterification

A reaction, prone to by-product generation, was chosen to evaluate the present resins as well as standard ones of the prior art: the reaction of n-butyl acetate with n-hexanol (U.S. Pat. No. 5,426,199, Example-9). Twelve grams dried (vacuum, 12 hours, 100° C.) resin catalyst were added to a flask with a distillation condenser (to collect butanol), followed by 110 grams n-butanol. The mixture was heated to and held at 120° C. for 1 hour, adding 25 grams of n-butyl acetate when it first reached 80° C.: no or very little conversion or by-products was observed. The mixture was then heated to and held at 140° C. for 1 hours. Gas chromatographic analysis showed the results compiled in Table-1.

TABLE 1

Transesterification of n-butyl acetate with n-hexanol

| | Resin | Dry wt eq/kg | Sulphonation Morphology | | Reaction Conditions | Conversion wt. % | Ether By-Products, wt % | | |
|---|---|---|---|---|---|---|---|---|---|
| | | | | | | | Dibutyl | Dihexyl | sum |
| 1. | Example-5 | 1.07 | Partial | Throughout | 120° C./1 hr, then 140° C/1 hr | 79 | 0.54 + | 0.51 = | 1.05 |
| 2. | Example-6 | 2.17 | Partial | Throughout | 120° C./1 hr, then 140° C/1 hr | 94 | 1.29 + | 0.16 = | 1.45 |
| 3. | CT175 | 5.09 | Full | (Throughout) | 120° C./1 hr, then 140° C/1 hr | 68 | 1.72 + | 0.59 = | 2.31 |
| 4. | Amberlyst-15 | 4.94 | Full | (Throughout) | 120° C./1 hr, then 140° C/1 hr | 63 | 4.38 + | 0.99 = | 5.37 |
| 5.** | "F" | 1.15 | Partial | Shell-core~ | 120° C./2 hr | 86 | 1.79 + | 0.59 = | 2.38 |
| 6.** | "A" | 5.0 | Full | (Throughout) | 120° C./2 hr | 87 | 3.11 + | 2.97 = | 6.08 |

**From U.S. Pat. No. 5,426,199.
~Unfunctionalized core, functionalized shell.

Example-8

Reduction in Free Fatty Acids

Table-1 shows the extraordinary fact that the partially-substituted resins of the present invention can give higher conversions as well as reduced by-products (in comparison to fully-substituted resins, entries Example-5 & Example-6 versus CT175 & Amberlyst-15 in Table-1) in the transesterification. The resin of Example-6 showed higher conversion than Example-5, but also somewhat higher by-products.

Figure 5:
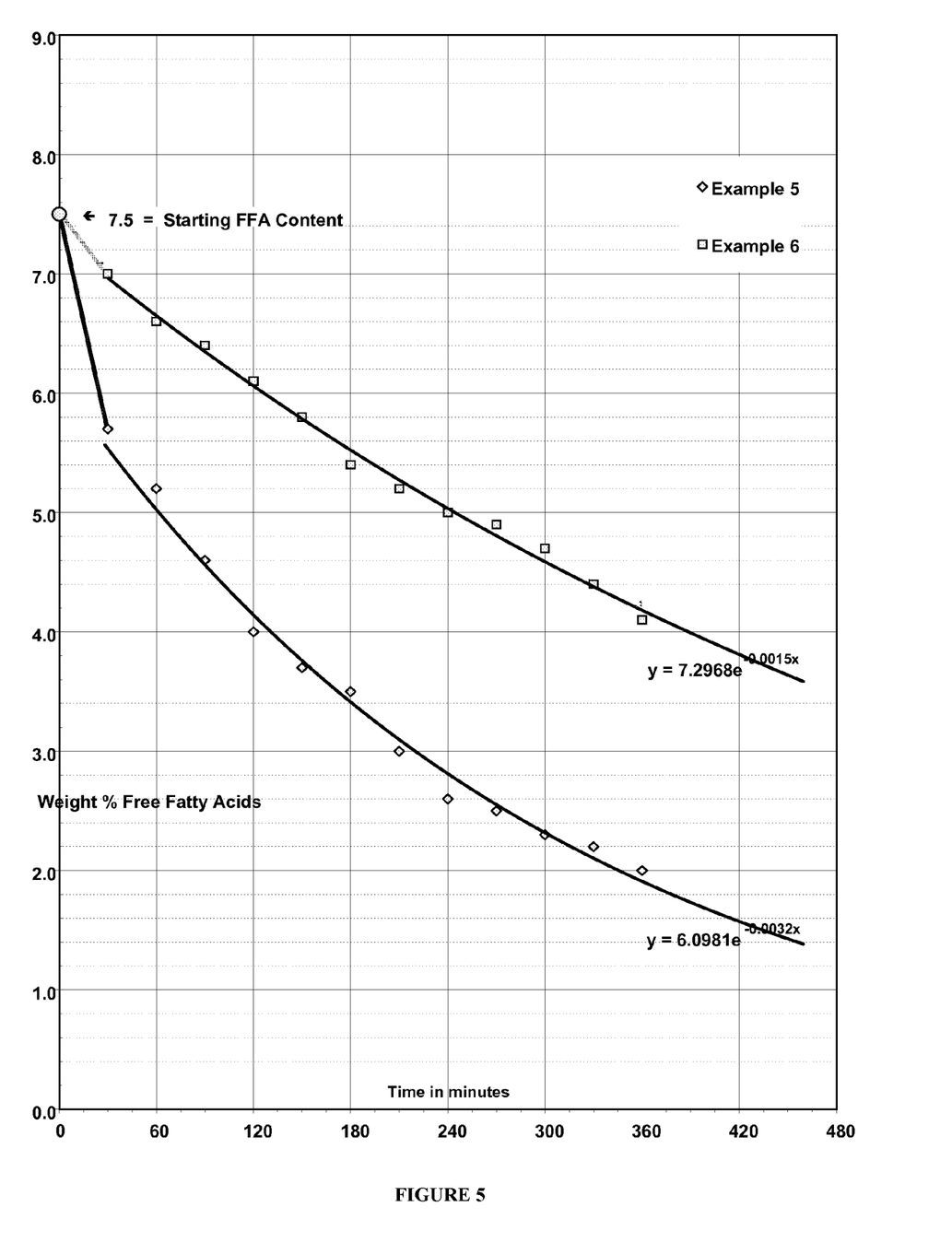
FIG. 5. Decrease in free fatty acids in vegetable oil at 50° C.

A further study of conversion efficiency was conducted; this time in an esterification reaction, the reduction in free fatty acids in vegetable oil: 30 g dry resin was soaked in methanol, drained, and added to 500 ml of oil plus 50 ml methanol; the decrease in fatty acids was measured at 50° C. over 6 hours. FIG. 5 shows the data points and trendlines. Here, the resin of Example-5 showed faster conversion than Example-6 (see FIG. 5).

What is claimed is:

1. A method of catalyzing a reaction comprising:
   (a) selecting a first reactant and a second reactant; and
   (b) combining the first reactant, second reactant, and a Bronsted-acid resin catalyst containing aromatic groups; and
   (c) carrying out the reaction to form a product;
   wherein the Bronsted-acid resin catalyst is an ion exchange resin that is sulfonated essentially uniformly throughout the resin, the degree of sulfonation is less than 51% of the aromatic groups of the resin, the variation in sulfur density throughout the resin is within 14%, and the reaction is selected from the group consisting of esterification, transesterification, etherification, phenol condensation with carbonyl compounds, phenol C-alkylation, and olefin oligomerization reactions.

2. The method of claim 1, wherein the reaction is (a) an esterification reaction or (b) a transesterification reaction of an ester with an alcohol or carboxylic acid.

3. The method of claim 2, wherein the first reactant is a C1 to C24 alcohol or C1 to C24 olefin.

4. The method of claim 2, wherein the second reactant is a C1 to C24 organic acid or C2 to C76 organic ester or polyester.

5. The method of claim 2, wherein a reactant is a triglyceride.

6. The method of claim 1, wherein the product is a bisphenol, the first reactant is a C6 to C20 phenolic compound and the second reactant is a C1 to C24 carbonyl compound.

7. The method of claim 1, wherein the product is an olefin oligomer, and the first and second reactants are independently C2 to C10 compounds.

8. The method of claim 7, wherein the olefin oligomer comprises an iso-olefin.

9. The method of claim 7, wherein the first and second reactants are independently C4 to C10 compounds.

10. The method of claim 1, wherein the product is a phenol alkylate, the first reactant is a phenol, and the second reactant is an olefin.

11. The method of claim 1, wherein the reaction is better controlled compared to the same reaction using a fully-functionalized resin catalyst.

12. The method of claim 1, wherein the resin catalyst is a macroporous resin.

13. The method of claim 1, wherein the resin catalyst contains macropores having an average diameter of at least 150 Angstroms.

14. The method of claim 1, wherein the resin has a controlled, selected, permanent, micropore structure.

15. A method of catalyzing a reaction comprising:
   (a) contacting a copolymer having aromatic groups with a solvent that swells or permeates the copolymer;
   (b) sulfonating the copolymer to form a Bronsted-acid resin catalyst wherein the resin is sulfonated essentially uniformly throughout the resin and 51% or less of the aromatic groups are sulfonated, the variation in sulfur density throughout the resin being within 14%, to form a catalyst;
   (c) selecting a first reactant and a second reactant;
   (d) combining a first reactant, a second reactant, and the Bronsted-acid resin catalyst; and
   (e) reacting the first and second reactant to form a product, wherein the reaction is selected from the group consisting of esterification, transesterification, etherification, phenol condensation with carbonyl compounds, phenol C-alkylation, and olefin oligomerization reactions.

16. The method claim 15, wherein the solvent that swells the copolymer for sulfonating the copolymer is a mostly-inert solvent.

17. The method of claim 15 wherein the solvent is methylene chloride.

18. The method of claim 1, wherein 33% or less of the aromatic groups are sulfonated.

19. The method of claim 1, wherein 20% or less of the aromatic groups are sulfonated.

20. The method of claim 15, wherein 33% or less of the aromatic groups are sulfonated.

21. The method of claim 15, wherein 20% or less of the aromatic groups are sulfonated.

22. The method of claim 1, wherein the reaction is a transesterification reaction.

23. The method of claim 22, wherein 33% or less of the aromatic groups are sulfonated.

24. The method of claim 22, wherein 20% or less of the aromatic groups are sulfonated.

25. A method of catalyzing a reaction, comprising:

reacting a first reactant and a second reactant in the presence of a Bronsted-acid resin catalyst containing aromatic groups to form a product;

wherein the Bronsted-acid resin catalyst is an ion exchange resin that is sulfonated essentially uniformly throughout the resin, the degree of sulfonation is less than 20% of the aromatic groups of the resin, the variation in sulfur density throughout the resin is within 25%, and the reaction is selected from the group consisting of esterification, transesterification, etherification, phenol condensation with carbonyl compounds, phenol C-alkylation, and olefin oligomerization reactions.

\* \* \* \* \*

UNITED STATES PATENT AND TRADEMARK OFFICE
CERTIFICATE OF CORRECTION

PATENT NO.      : 8,729,295 B2
APPLICATION NO. : 12/258123
DATED           : May 20, 2014
INVENTOR(S)     : James A. Dale, Luc Froment and Satish Bapat It is certified that error appears in the above-identified patent and that said Letters Patent is hereby corrected as shown below:

Title Page, item (56):

Page 2, Column 1, OTHER PUBLICATIONS

Line 1, delete "characterizatin" and insert -- characterization --.

Page 2, Column 2, OTHER PUBLICATIONS

Line 7, delete "functionalizatin" and insert -- functionalization --.

Page 2, Column 2, OTHER PUBLICATIONS

Line 11, delete "polymr" and insert -- polymer --.

Page 2, Column 2, OTHER PUBLICATIONS

Line 12, delete "characerisation" and insert -- characterization --.

Page 2, Column 2, OTHER PUBLICATIONS

Line 20, delete "Sono" and insert -- Sons --.

In the Claims:

Column 17

Claim 3, lines 58-59, delete "C1 to C24" and insert -- $C_1$ to $C_{24}$ --.

Column 17

Claim 3, line 59, delete "C1 to C24" and insert -- $C_1$ to $C_{24}$ --.

Signed and Sealed this
Seventh Day of October, 2014

Michelle K. Lee
*Deputy Director of the United States Patent and Trademark Office*

Column 17

Claim 4, line 61, delete "C1 to C24" and insert -- $C_1$ to $C_{24}$ --.

Column 17

Claim 4, line 61, delete "C2 to C76" and insert -- $C_2$ to $C_{76}$ --.

Column 17

Claim 6, line 66, delete "C6 to C20" and insert -- $C_6$ to $C_{20}$ --.

Column 17

Claim 6, line 67, delete "C1 to C24" and insert -- $C_1$ to $C_{24}$ --.

Column 18

Claim 7, line 22, delete "C2 to C10" and insert -- $C_2$ to $C_{10}$ --.

Column 18

Claim 9, line 26, delete "C4 to C10" and insert -- $C_4$ to $C_{10}$ --.

Column 18

Claim 16, line 57, after "method" insert -- of --.